(12) United States Patent
Chiba

(10) Patent No.: US 6,192,294 B1
(45) Date of Patent: Feb. 20, 2001

(54) POSITIONING SYSTEM AND METHOD

(75) Inventor: Takeyoshi Chiba, Yamagata (JP)

(73) Assignee: NEC Corporation, Tokyo (JP)

( * ) Notice: Under 35 U.S.C. 154(b), the term of this patent shall be extended for 0 days.

(21) Appl. No.: 09/106,254

(22) Filed: Jun. 29, 1998

(30) Foreign Application Priority Data

Jun. 30, 1997 (JP) .................................................. 9-174564

(51) Int. Cl.$^7$ .................................................... G06F 7/00
(52) U.S. Cl. ............................................ 700/214; 700/56
(58) Field of Search ................................. 700/56, 57, 58, 700/60, 61, 64, 214

(56) References Cited

U.S. PATENT DOCUMENTS

| | | | | |
|---|---|---|---|---|
| 5,426,581 | * | 6/1995 | Kishi et al. ...................... | 364/167.01 |
| 5,740,061 | * | 4/1998 | Dewey et al. ................... | 364/478.02 |
| 5,818,723 | * | 10/1998 | Dimitri ............................ | 364/478.02 |
| 5,867,003 | * | 2/1999 | Hashimoto et al. ............. | 318/568.11 |
| 5,959,866 | * | 9/1999 | Hanaoka et al. ................ | 369/34 |

FOREIGN PATENT DOCUMENTS

| | | |
|---|---|---|
| 62-236170 | 10/1987 | (JP) . |
| 64-46808 | 2/1989 | (JP) . |
| 4-20403 | 1/1992 | (JP) . |
| 5-325355 | 12/1993 | (JP) . |

OTHER PUBLICATIONS

Japanese Office Action, dated Aug. 18, 1999, with English language translation of Japanese Examiner's comments, 1 page.

* cited by examiner

*Primary Examiner*—Dennis M. Butler
(74) *Attorney, Agent, or Firm*—McGuireWoods LLP

(57) ABSTRACT

In a method for positioning a medium carrying device at a desired one of processing sections which are provided on a base frame in a designed arrangement, an error between a designed position and a reference position is detected for each of three predetermined sections. Based on detected errors of the predetermined sections, a corrective value is calculated for each of the processing sections. The medium carrying device is carried and positioned at a desired processing section using a corrective value of the desired processing section.

14 Claims, 8 Drawing Sheets

POSITIONING SYSTEM AND METHOD

BACKGROUND OF THE INVENTION

1. Field of the Invention

The present invention relates to an information medium carrying system, and more particularly to positioning system and method for positioning an information medium carrying device at one of a plurality of medium processing sections.

2. Description of the Related Art

In Japanese Patent Laid-Open Publication No. 5-325355 disclosed a carrying and storing mechanism for cartridge-type recording mediums. In a cabinet of a medium carrying apparatus, storage shelves having a plurality of storage cells for housing cartridge recording mediums, are arranged facing each other. An access mechanism for carrying a medium grasping device is provided between the opposing shelves. Near the storage shelves are provided a recording/reproducing device for recording and reproducing data on the recording mediums, and an insert-eject opening through which a recording medium is inserted to an ejected from inside.

A conventional medium carrying apparatus as described above is generally equipped with a positioning means which is used when the access mechanism carries the medium grasping device to one of medium processing sections, for example, the recording/reproducing device, the storage cell, the insert-eject opening or the like. The positioning means is comprised of positioning flags fixed to each of storage shelves, and flag detection sensors provided on the access mechanism side. The medium grasping device can be carried to a desired processing section while the flag detection sensors detecting the positioning flags.

Actually, the access mechanism which determines the position of the medium grasping device, the processing sections such as the storage cells, and the position detecting sensor are provided separately from each other. As a result, variations in precision when assembling the respective elements of the configuration cause positioning errors.

As a conventional example, a positioning method using an absolute positioning sensor and a relative positioning sensor has been proposed in Japanese Patent Laid-Open Publication No. 4-20403. According to this positioning method, the absolute positioning sensor is used for a first positioning mode and, if the first positioning fails to be successfully ended, then a relative error is measured and the relative positioning sensor is used for a second positioning mode to correct the relative position error.

However, this type of positioning method needs much more time for positioning in the case where amount of storage of the recording medium is increased by the addition of another cabinet having similar processing sections as described before.

Another method of solving this problem is to estimate in advance the amount of error due to variation in assembly precision for each processing section, and to store these errors as corrective values. Then, the operation of the access mechanism is corrected as appropriate based on the corrective values to position the medium grasping device at a desired processing section.

However, with this conventional positioning correction method, when amount of storage of the recording medium is increased by the addition of another cabinet having similar processing sections, the number of points at which the amount of error needs to be measured in advance becomes greater. As a consequence, the error at all processing sections must be measured when setting up the medium carrying apparatus, or when performing maintenance of the apparatus. This results in disadvantages that measurement takes considerable time and is complex.

SUMMARY OF THE INVENTION

It is an object of the present invention to provide a positioning system and method for a medium carrying apparatus in which amounts of error at medium processing sections can be easily measured with a large reduction in measurement time and a simplified operation.

According to the present invention, in a method for positioning a medium carrying device at a desired one of processing sections which are provided on a base frame in a designed arrangement, after selecting at least three predetermined sections which are two-dimensionally arranged on the base frame, an error between a designed position and a reference position is detected for each of the predetermined sections, where the designed position is an actual position to which the medium carrying device is moved in each of the predetermined sections according to the designed arrangement and the reference position is a predetermined position in each of the predetermined sections. Based on detected errors of the predetermined sections, a corrective value is calculated for each of the processing sections. The medium carrying device is carried and positioned at a desired processing section using a corrective value of the desired processing section.

The processing sections are secured to the base frame in the designed arrangement and the distance between the processing sections are guaranteed by the precision of the base frame. Therefore, it is possible to determine the corrective values for all processing sections based on the detected errors of the predetermined sections. Hence there is no need to perform measuring for all the processing sections when, for instance, setting up the medium carrying apparatus or carrying out maintenance thereto, enabling measuring time to be greatly reduced.

DESCRIPTION OF THE PREFERRED EMBODIMENT

The present invention will next be explained in more detail referring to the accompanying drawings.

Figure 1:
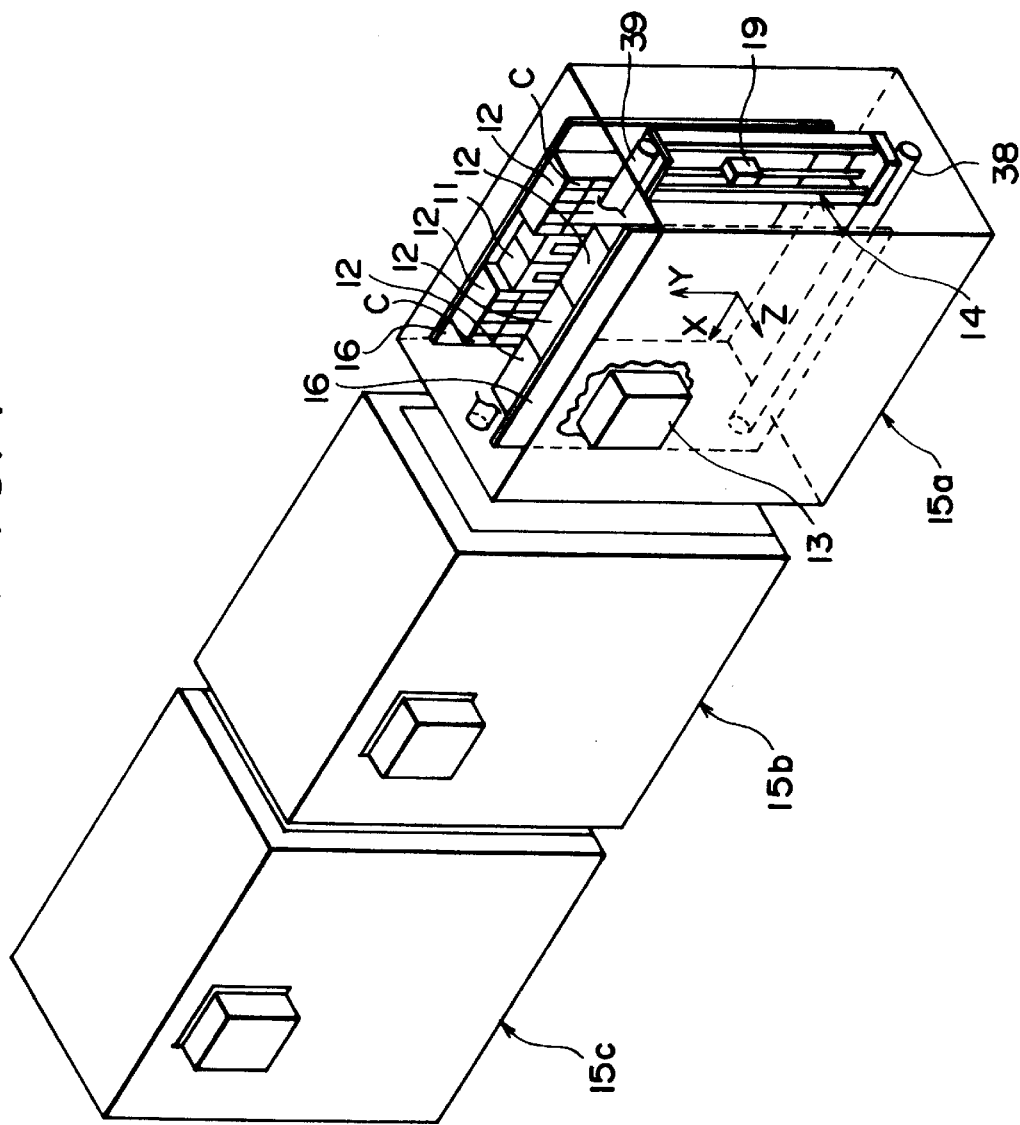
FIG. 1 is a perspective view of a cartridge magnetic tape automatic processing apparatus according to a first embodiment of the present invention.

In FIG. 1, there is shown a cartridge magnetic tape automatic processing apparatus employing a positioning system according to an embodiment of the present invention.

In the embodiment, the automatic processing apparatus is comprised of cabinets 15a, 15b and 15c which are connected in sequence in the direction indicated by X. Each of the cabinets 15a, 15b and 15c contains storage cell frames 12 as facing each other in the direction indicated by Z. There is further provided an access mechanism 14 which carries a medium grasping device 19 in the X and Y directions over the cabinets 15a, 15b and 15c. Since cabinets 15a, 15b and 15c have the same configuration, the descriptions will concentrate on cabinet 15a.

Inside cabinet 15a, a pair of honeycomb frames 16 are provided facing each other along the front-to-rear direction of the apparatus (i.e. along the Z direction) with a predetermined space in between, the honeycomb frames 16 being fixed to the cabinet 15a. A recording/reproducing apparatus 11 is placed in the center of the rear honeycomb frame 16 with storage cell frames 12 on the left and right sides thereof. The recording/reproducing apparatus 11 and the two storage cell frames 12 on the left and right sides thereof are also fixed to the rear honeycomb frame 16.

The front honeycomb frame 16 has three storage cell frames 12 secured thereto in a predetermined arrangement, which respectively face the recording/reproducing apparatus 11 and the left and right storage cell frames 12 on the rear honeycomb frame 16. Furthermore, an insert-eject opening 13 is provided on the front side of the front honeycomb frames 16 in a predetermined arrangement with the storage cell frames 12. A recording medium such as a ½-inch cartridge magnetic tape can inserted into and be ejected from the cabinet 15a through the insert-eject opening 13 which is placed at the predetermined position inside the cabinet 15a. Each of the storage cell frames 12 provided at the front and rear of the apparatus has a predetermined number of storage cells C, which are secured in a predetermined arrangement to the honeycomb frames 16.

Figure 2:
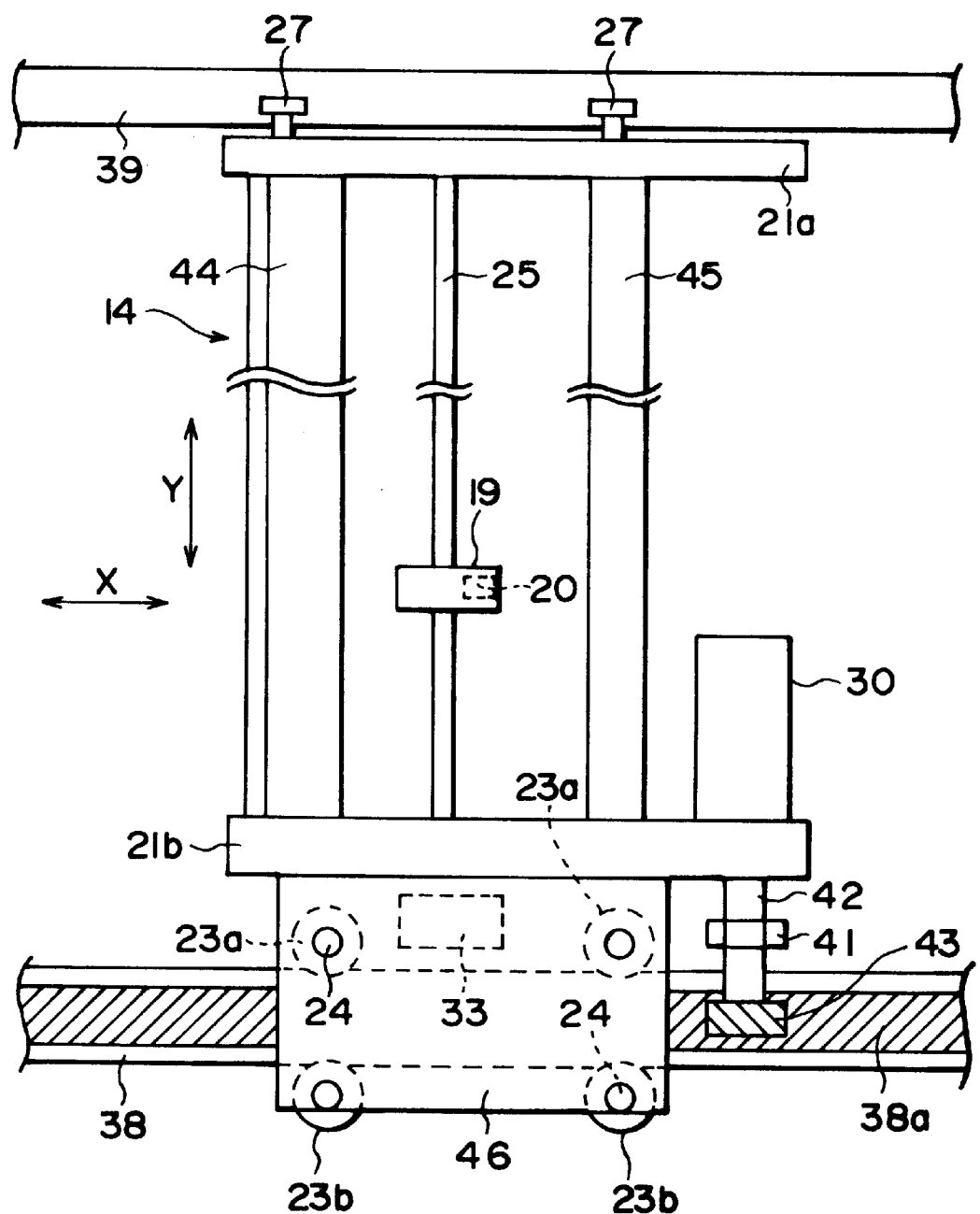
FIG. 2 is a front view of an access mechanism of FIG. 1 seen from the front side.

Referring to FIG. 2, the access mechanism 14 is capable of carrying the medium grasping device 19 to a desired one of the processing sections, for example, one of the storage cells C, the recording/reproducing apparatus 11 and the insert-eject opening 13. An X-direction rail 38, which extends horizontally along the X direction and is secured to the honeycomb frames 16 at the front and rear of the apparatus, is provided in the lower part of the cabinet 15a. A rack gear 38a runs along the length of the X-direction rail 38. Furthermore, a top rail 39, which extends parallel to the X direction and is secured to the honeycomb frames 16 at the front and rear of the apparatus, is provided in the upper part of the cabinet 15a.

The access mechanism 14 is composed of an upper base 21a and a lower base 21b, support bars 44 and 45 which extend between the upper base 21a and the lower base 21b, and a guide bar 25 which guides the medium grasping device 19 along the Y direction. A guide portion 46 protruding downward from the lower base 21b has a Y-direction drive motor 33 for hoisting and lowering the medium grasping device 19 along the Y direction by means of a predetermined rotation transmission mechanism. The medium grasping device 19 is provided with a actual position detecting sensor 20 having a reflective type laser sensor or the like.

Figure 3:
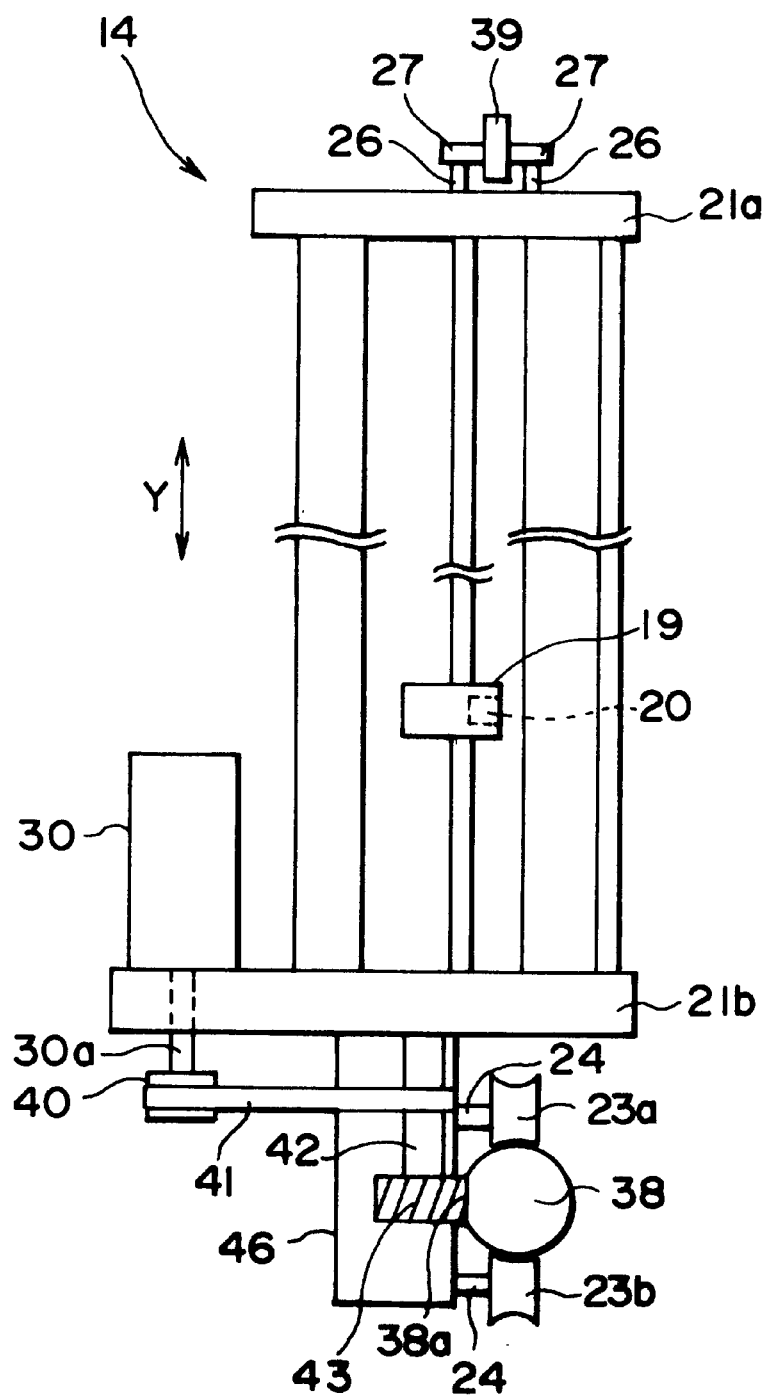
FIG. 3 is a side view of the access mechanism of FIG. 1 as seen from the right side.

Referring to FIG. 3, the lower base 21b is provided with an X-direction drive motor 30 having a rotating axle 30a extending downward through the lower base 21b and a drive axle 42 protruding below in parallel with the axle 30a. A pulley 40 is secured to the tip of the axle 30a. A pinion 43, which interlocks with the rack gear 38a on the X-direction rail 38, is secured to the tip of the drive axle 42. A belt 41 is wrapped around the pulley 40 and the drive axle 42. On the guide portion 46, a pair of guide rollers 23a and 23b are supported by axles 24 so as to be freely rotable. The guide rollers 23a and 23b each comprise grooves shaped in corresponding with the curving outer surface of the X-direction rail 38, which clasp the X-direction rail 38 from above and below. The state of this clasp can be adjusted by altering the distance between the axles 24.

Figure 4:
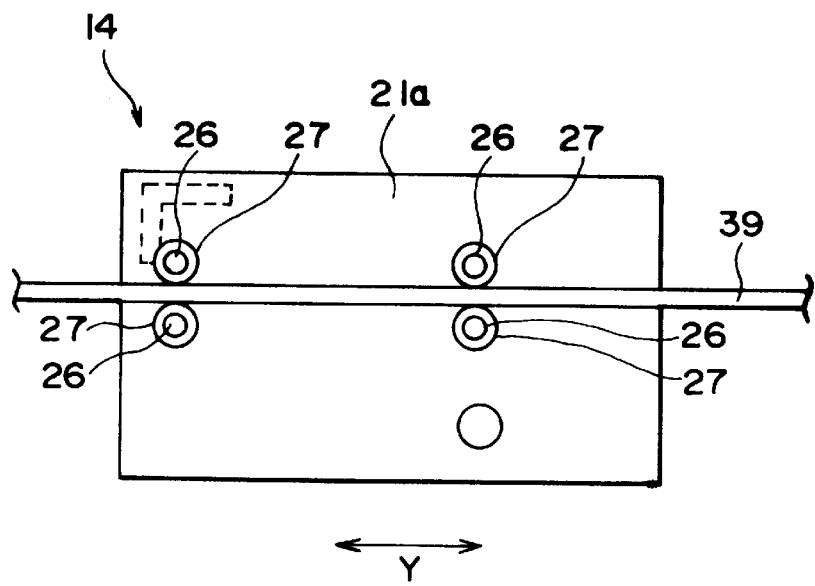
FIG. 4 is a top view of the access mechanism of FIG. 1 as seen from above.

Referring to FIG. 4, the upper base 21a is composed of pairs of upwardly projecting axles 26 which clasp the top rail 39. Freely rotatable rollers 27 are provided at the tips of the axles 26 so as to clasp the top rail 39. These pairs of rollers 27 prevent the access mechanism 14 from falling toward the front and back of the apparatus.

In the access mechanism 14 described above, when the X-direction drive motor 30 rotates, the rotations are transferred via the belt 41 to the drive axle 42. When the pinion 43 rotates against the rack gear 38a, the entire access mechanism 14 moves along the X direction. With the additional rotation of the Y-direction drive motor 33 in the Y-direction, the medium grasping device 19 can be carried freely along the X and Y directions.

Figure 5:
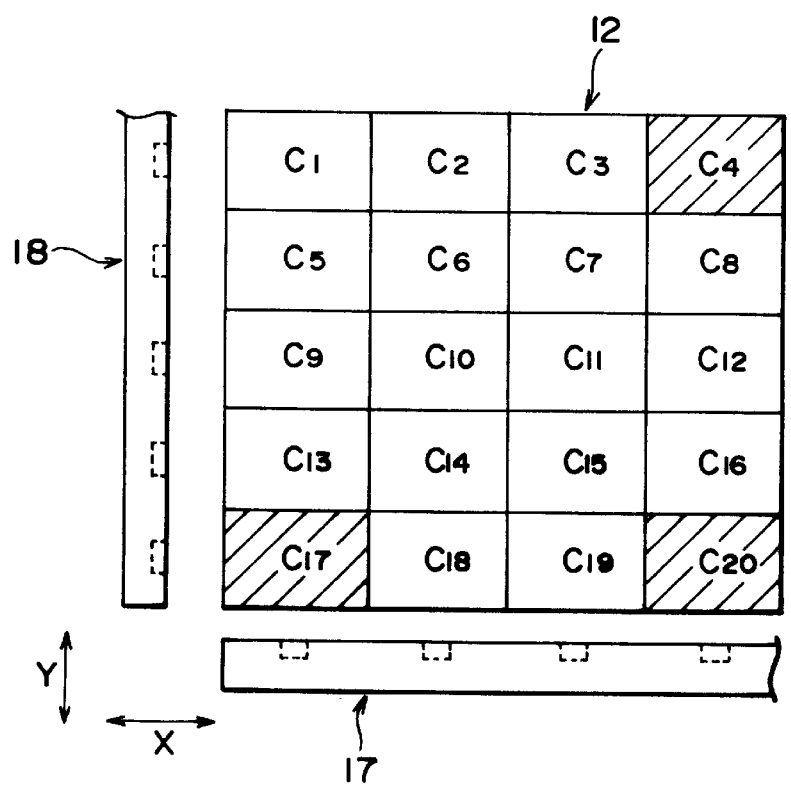
FIG. 5 is a front view of a configuration of storage shelves.

Referring to FIG. 5, a storage frame 12 is composed of storage cells $C_1$–$C_{20}$, which are arranged in a sequence of rows in the X and Y directions. All the storage cells $C_1$–$C_{20}$ have equal lengths along the X direction (width) and equal lengths along the Y direction (height). Within the cabinet 15a, there are provided X direction flags 17 for detecting positions of storage cells in the X direction and Y direction flags 18 for detecting positions of the storage cells along the Y direction. These X direction and Y direction flags 17 and 18 are secured to the front and rear honeycomb frames 16 provided inside the cabinet 15a in order to determine the respective relative positions of the storage cells $C_1$–$C_{20}$. The X direction and Y direction flags 17 and 18 are also used to detect the respective positions of the recording/reproducing apparatus 11, the insert-eject opening 13 and the like in the X direction and Y direction, respectively.

Furthermore, the access mechanism 14 comprises flag detection sensors (not shown in the figure) for detecting the processing sections of, for instance, the storage cells $C_1$–$C_{20}$, the recording/reproducing apparatus 11 and the insert-eject opening 13, while moving alongside the X direction flags 17 and Y direction flags 18 in correspondence with the movement of the medium grasping device 19. The access mechanism 14 uses the flag detection sensors to detect each of the X direction flags 17 and the Y direction flags 18 and carries the medium grasping device 19 to the desired processing section.

Hereinafter, three storage cells $C_4$, $C_{17}$ and $C_{20}$ shaded with diagonal lines in FIG. 5 are selected as predetermined sections which are used for corrective value calculation. These predetermined sections preferably selected from processing sections placed outermost on the honeycomb frame 16.

Figure 6:
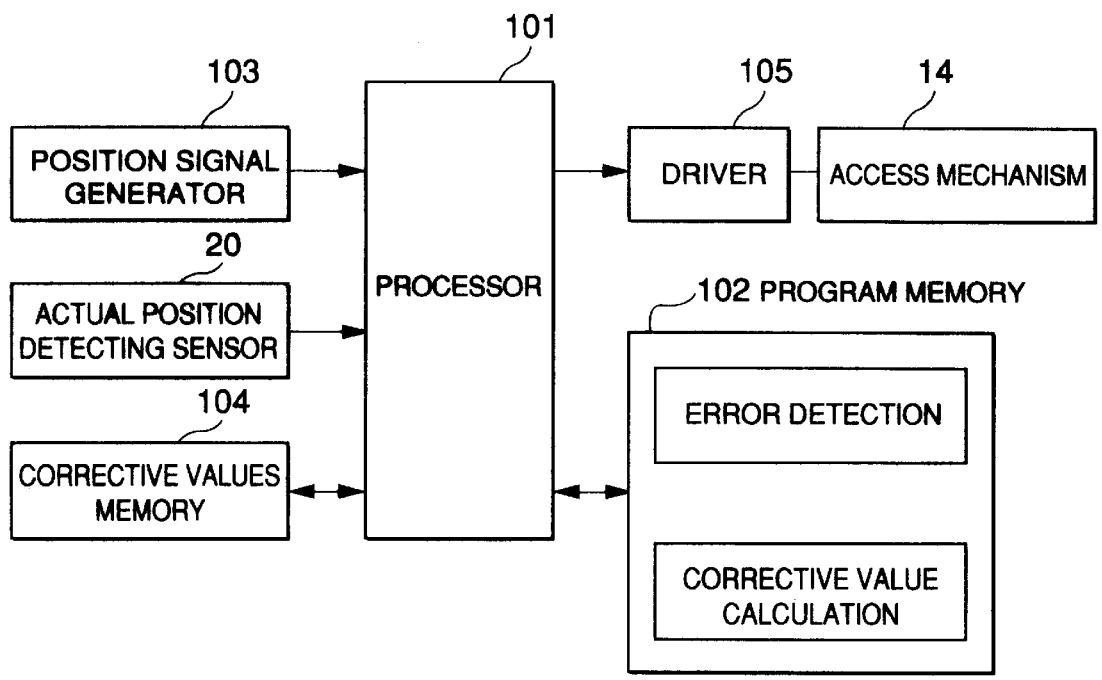
FIG. 6 is a block diagram illustrating a control system for performing positioning correction according to the present invention.

Referring to FIG. 6, the control system includes a processor 101 which controls positioning using an error detection program and a corrective value calculation program stored in a program memory 102. The processor 101 determines corrective values based on signals received from an actual position detecting sensor (correction sensor) 20 and a position signal generator 103, and stores these values in a corrective values memory 104. Then, the processor 101 operates the access mechanism 14 by means of a driver 105.

When the medium grasping device 19 is being carried, the actual position detecting sensor 20 receives laser light reflected from walls around the processing sections of the storage cells C and the like. Based on the state of this reflected light, the actual position detecting sensor 20 sends out actual measurement data relating to the processing sections. The position signal generator 103 including flag detection sensors. X direction flags 17 and Y direction flags 18, sends a position signal to the processor 101. The position signal varies in correspondence with the movement of the medium grasping device 19.

The driver 105 rotates the X-direction drive motor 30 and the Y-direction drive motor 33 under the control of the processor 101. Using the driver 105, the processor 101 drives the access mechanism 14 and thereby carries the medium grasping device 19 to a desired processing section in accordance with the position signal which varies depending on the movement of the medium grasping device 19.

Running the error detection program, the processor 101 detects an error between each of reference positions of three areas, $C_4$, $C_{17}$ and $C_{20}$ shaded with diagonal lines in FIG. 5 and a designed position corresponding to the reference position. A designed position is a position which the medium grasping device 19 is moved to according to design. In practice, error is detected from a position signal generated by the position signal generator 103 by slightly moving the medium grasping device 19 which is presently at a designed position so as to be exactly overlapped with a reference position using actual measurement data detected by the actual position detecting sensor 20.

Using the corrective value calculation program, the processor 101 detects corrective values based on the distances from each processing section to the predetermined reference positions which have been detected beforehand, and the amounts of error between each reference position and the corresponding designed position. The calculated corrective values are stored onto the corrective values memory 104.

Figure 7A:
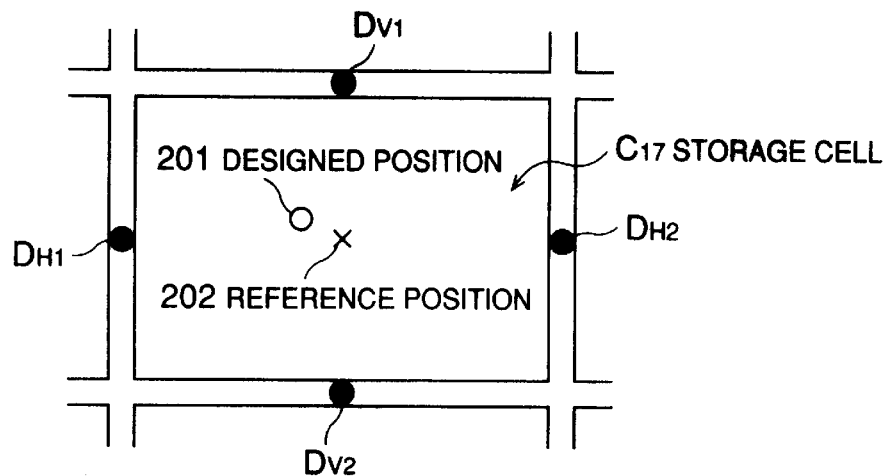
FIG. 7A is a diagram showing a storage cell of the storage shelves for explanation of actual error detection.

Referring to FIG. 7A, in the case where the medium grasping device 19 is moved to the predetermined storage cell $C_{17}$, the medium grasping device 19 is actually moved to the designed position 201 within the storage cell $C_{17}$. When at the designed position 201, the actual position detecting sensor 20 outputs an actual error signal because four laser sensors $D_{E1}$, $D_{H2}$, $D_{V1}$ and $D_{V2}$ which are arranged to detect four walls around each cell output different sensing signals. The processor 101 drives the access mechanism 14 so as to move the medium grasping device 19 to the reference position 202 at which the actual error signal becomes zero. In other words, the medium grasping device 19 is slightly moved in the direction which causes the magnitude of the actual error signal to be reduced. The moving distance and direction from the designed position 201 to the reference position 202 is detected by the position signal generator 103 and is used as the error or corrective value of the storage cell $C_{17}$. It is the same with the other predetermined cells (here, $C_4$ and $C_{20}$).

Figure 7B:
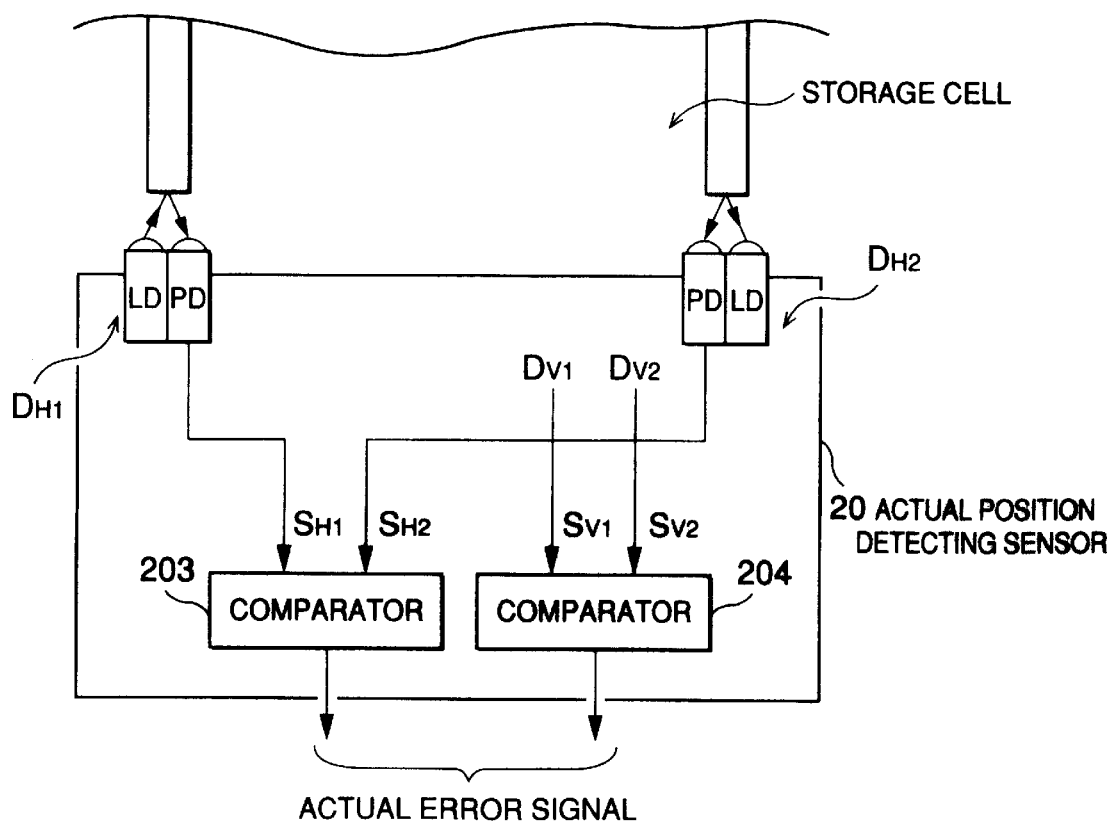
FIG. 7B is a schematic diagram showing an internal circuit of an actual position detection sensor.

Referring to FIG. 7B, the actual position detecting sensor 20 includes the four laser sensors $D_{H1}$, $D_{M2}$, $D_{V1}$ and $D_{V2}$ which are arranged to detect four walls around each cell and two comparators 203 and 204. Each laser sensor is comprised of a laser diode LD and a photo detector PD wherein the laser beam emitted from the laser diode LD is reflected from the wall and the intensity of reflected light is detected by photo detector PD. The two laser sensor $D_{H1}$ and $D_{H2}$ which are horizontally provided output sensing signals $S_{H1}$ and $S_{H2}$, respectively, and the other two laser sensors $D_{V1}$ and $D_{V2}$ which are vertically provided output sensing signals $S_{V1}$ and $S_{V2}$, respectively. The comparator 203 outputs a difference between the horizontal sensing signals $S_{H1}$ and $S_{H2}$, and the comparator 204 outputs a difference between the vertical sensing signals $S_{V1}$ and $S_{V2}$. The respective difference signals are used as the actual error signal as described above.

After the respective errors or corrective values of the predetermined storage cells $C_4$, $C_{17}$ and $C_{20}$ have been obtained as described above, these three values are used to estimate the corrective values of the other storage cells. The details will be described hereinafter with reference to FIG. 8.

Figure 8:
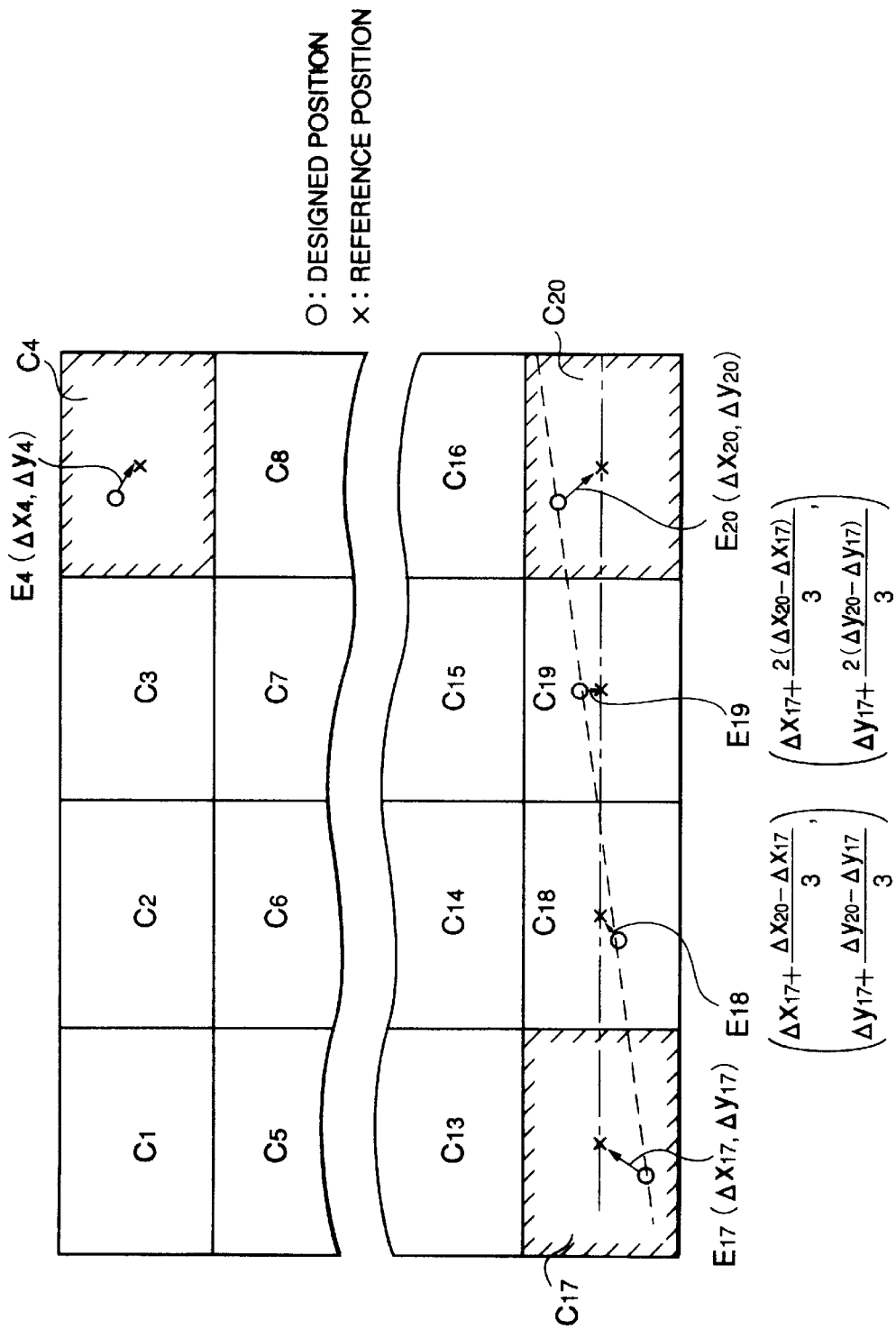
FIG. 8 is a diagram illustrating a configuration of storage shelves for explanation of positioning correction according to the present invention.

Referring to FIG. 8, it is assumed for simplicity that the respective corrective values of the predetermined storage cells $C_{17}$ and $C_{20}$ and $E_{17}$ ($\Delta x_{17}$, $\Delta y_{17}$) and $E_{20}$ ($\Delta x_{20}$, $\Delta y_{20}$). In this case, the respective corrective values $E_{18}$ and $E_{19}$ of the storage cells $C_{18}$ and $C_{19}$ are represented by the following equations:

$$E_{14}=(\Delta x_{17}+(\Delta x_{20}-\Delta x_{17})/3,\ \Delta y_{17}+(\Delta y_{20}-\Delta y_{17})/3) \text{ and}$$

$$E_{19}=(\Delta x_{17}+2(\Delta x_{20}-\Delta x_{17})/3,\ \Delta y_{17}+2(\Delta y_{20}-\Delta y_{17})/3).$$

Similarly, the respective corrective values $E_8$, $E_{12}$ and $E_{16}$ of the storage cells $C_8$, $C_{12}$ and $C_{16}$ are represented by the following equations:

$$E_8=(\Delta x_{20}+3(\Delta x_4-\Delta x_{20})/4,\ \Delta y_{20}+3(\Delta y_4-\Delta y_{20})/4)$$

$$E_{12}=(\Delta x_{20}+2(\Delta x_4-\Delta x_0)/4,\ \Delta y_{20}+2(\Delta y_4-\Delta y_{20})/4) \text{ and}$$

$$E_{16}=(\Delta x_{20}+(\Delta x_4-\Delta x_{20})/4,\ \Delta y_{20}+(\Delta y_4-\Delta y_{20})/4).$$

The deviations of processing sections including the storage cells $C_1$–$C_{20}$ are guaranteed by the precision of the honeycomb frame 16. In other words, the deviation of each processing section can be obtained based on the distance from the predetermined positions. Therefore, all the corrective values can be estimated from the errors measured for predetermined storage cells $C_{17}$, $C_{20}$ and $C_4$.

For example, the storage cell $C_6$ is positioned at a distance of 3 cells from the storage cell $C_{18}$ or of 2 cells from the storage cell $C_8$. Since the corrective values $E_{18}$ and $E_6$ have been obtained as described above, the corrective value $E_6$ of the storage cell $C_6$ can be obtained by $E_{16} \times E_8 / E_{20}$. It is the same with other storage cells.

Figure 9:
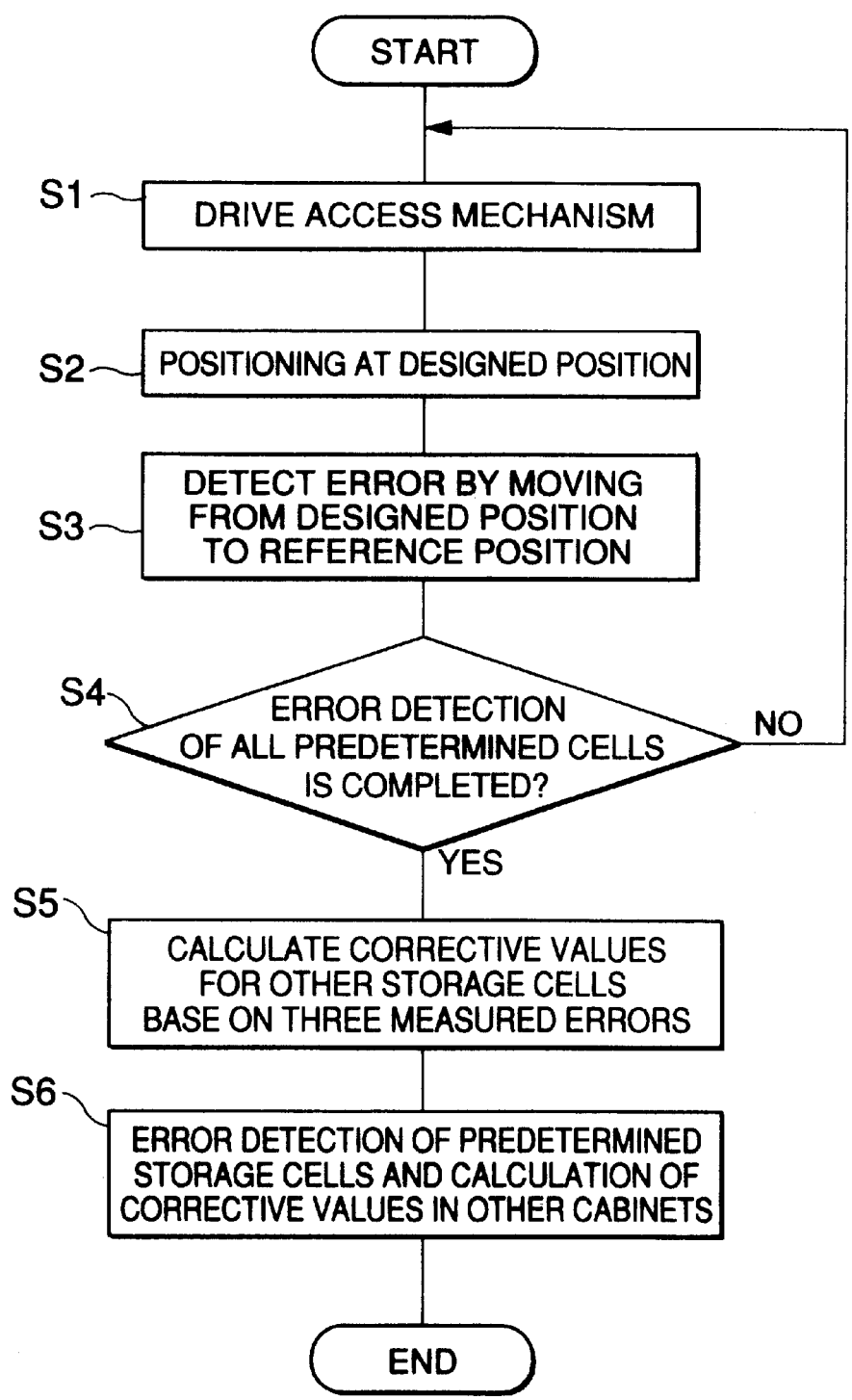
FIG. 9 is a flowchart illustrating a control operation when performing positioning correction according to the present invention.

Referring to FIG. 9, for instance, when installing a cartridge magnetic tape automatic processing apparatus, the processor 101 drives the access mechanism 14 using the driver 105 in response to a predetermined switch, and carries the medium grasping device 19 toward storage cell $C_{17}$ which is a predetermined position (Step S1). When the position signal received from the position signal generator 103 indicates storage cell $C_{17}$, the processor 101 stops the access mechanism 14. Consequently, the medium grasping device 19 is positioned at the designed position of storage cell $C_{17}$ (Step S2).

In this state, the processor 101 drives the access mechanism 14 based on actual position measurement data supplied from the actual position detecting sensor 20, thereby slightly moving the medium grasping device 19 so as to exactly face the storage cell $C_{17}$. The processor 101 detects the error between the designed position and the reference position corresponding to designed position based on the position signal supplied by the position signal generator 103 (Step S3).

Next, similar measuring is carried out for storage cell $C_{20}$ and storage cell $C_4$, and the respective errors for storage cells $C_{20}$ and $C_4$ are detected.

When the errors for all predetermined storage cells $C_{17}$, $C_{20}$ and $C_4$ have been measured (YES in Step S4), the processor 101 runs the corrective value calculation program to calculate corrective values for storage cells $C_1$–$C_{20}$ based on their distance from the predetermined storage cells ($C_{17}$, $C_{20}$ and $C_4$) as described before and then stores these obtained corrective values onto the memory 104 (Step S5).

The storage cells $C_1$–$C_{20}$ are secured on a single honeycomb frame 16 in a predetermined arrangement and the distances between the storage cells $C_1$–$C_{20}$ are guaranteed by the part precision of the honeycomb frame 16. Therefore, the deviations of all storage cells on a single honeycomb frame 16 can be estimated from the errors measured for predetermined storage cells $C_{17}$, $C_{20}$ and $C_4$.

After determining the error for every storage cell in the front and rear of the cabinet 15a, the processor 101 for instance drives the access mechanism 14 so as to carry the medium grasping device 19 to the next cabinet 15b. Subsequently, the error detection program and the corrective value calculation program are used, as described above, to estimate corrective values for each of the processing sections in the front and rear of the cabinet 15b, and these corrective values are stored onto the memory 104. Then, the processor 101 drives the access mechanism 14 so as to carry the medium grasping device 19 into the next cabinet 15c. Corrective values are similarly determined for each processing section in the front and rear of the cabinet 15c, and these values are also stored onto the memory 104 (Step S6).

Once all the corrective values have been stored in the memory 104, the normal operation is performed as follows. When the processor 101 drives the access mechanism 14 by means of the driver 105, the medium grasping device 19 is carried toward a desired processing section. While driving the access mechanism 14, the processor 101 adds a corrective value relating to the desired processing section to the position signal from the position signal generator 103. As a result, the medium grasping device 19 is correctly positioned at the desired processing section.

Thus, according to the positioning system and method of the present invention, in a structure where processing sections such as storage cells, recording/reproducing apparatus 11 and insert-eject opening 13 and the like are provided in a predetermined arrangement on a honeycomb frame 16, the distances between the processing sections are guaranteed by the part precision of the honeycomb frame 16. Therefore, the corrective values for all processing sections can be determined by actual measuring of a plurality of predetermined processing sections. As a consequence, there is no need to measure every single processing section when the medium carrying apparatus is set up, thereby greatly reducing measuring time.

Furthermore, the position signal generator 103 may be comprised of rotary encoders which are provided to the output axles of the X-direction drive motor 30 and the Y-direction drive motor 33.

While there have been described what are at present considered to be preferred embodiments of the invention, it will be understood that various modifications may be made thereto, and it is intended that the appended claims cover all such modifications as fall within the true spirit and scope of the invention.

As explained above, according to the present invention, error relating to processing sections can be more easily obtained when for instance setting up or maintaining a medium carrying apparatus, and time required to perform measuring can be greatly shortened, thereby simplifying operations.

What is claimed is:

1. A method for positioning a medium carrying device at a desired one of processing sections which are provided on a base frame in a designed arrangement, comprising the steps of:
    a) selecting at least three predetermined sections which are two-dimensionally arranged on the base frame;
    b) detecting an error between a designed position and a reference position for each of the predetermined sections, where the designed position is an actual position to which the medium carrying device is moved in each of the predetermined sections according to the designed arrangement and the reference position is a predetermined position in each of the predetermined sections;
    c) calculating a corrective value for each of the processing sections based on detected errors of the predetermined sections; and
    d) positioning the medium carrying device at a desired processing section using a corrective value of the desired processing section.

2. The method according to claim 1, wherein, in the step a), the predetermined sections are selected from processing sections placed outermost on the base frame.

3. The method according to claim 1, wherein the step b) comprises the steps of:
    moving the medium carrying device to the designed position of each of the predetermined sections of according to the designed arrangement;
    moving the medium carrying device from the designed position to the reference position in each of the predetermined sections; and
    detecting distance and direction of movement of the medium carrying device to produce the error.

4. The method according to claim 1, wherein the step c) comprises the steps of:
    calculating a two-dimensional distribution of error from the detected errors of the predetermined sections;
    calculating the corrective value for each of the processing sections on the base frame based on the two-dimensional distribution of error.

5. The method according to claim 4, wherein the step c) comprises the steps of: p1 calculating a horizontal distribution of error and a vertical distribution of error from the detected errors of the predetermined sections;
    calculating the corrective value for each of the processing sections on the base frame with respect to the horizontal distribution of error and the vertical distribution of error.

6. The method according to claim 5, wherein,
    the step a) selects three predetermined storage cells from an M×N array of storage cells each of which is indicated by C(I,J) and is designed to store an information medium, wherein the three predetermined storage cells C(1,1), C(M,1) and C(M,N) are placed at corners of the two-dimensional array, respectively, where I, J, M, and N are an integer, $1 \leq I \leq M$, and $1 \leq J \leq N$;
    the step b) detects errors E(1,1), E(M,1) and E(M,N) for the three predetermined storage cells C(1,1), C(M,1) and C(M,N), respectively; and the step c) comprises the steps of:
    calculating error E(I,1) for a storage cell C(I,1) and error E(M,J) for a storage cell C(M,J) using the following equations:

$$E(I,1)=E(1,1)+I/M\times(E(M,1)-E(1,1)) \text{ and}$$

$$E(M,J)=E(M,1)+J/N\times(E(M,N)-E(M,1));$$

calculating an error E(I,J) as a corrective value for a storage cell C(I,J) using the following equation:

$$E(I,J)=E(I,1)\times E(M,J)/E(M,1).$$

7. A system for positioning a medium carrying device at a desired one of processing sections which are provided on a base frame in a designed arrangement, comprising:
    an error detector for detecting an error between a designed position and a reference position for each of at least three predetermined sections which are two-dimensionally arranged on the base frame, where the designed position is an actual position to which the medium carrying device is moved in each of the predetermined sections according to the designed arrangement and the reference position is a predetermined position in each of the predetermined sections;
    a corrective value calculator for calculating a corrective value for each of the processing sections based on detected errors of the predetermined sections; and
    a controller for carrying and positioning the medium carrying device at a desired processing section using a corrective value of the desired processing section.

8. The system according to claim 7, wherein the predetermined sections are selected from processing sections placed outermost on the base frame.

9. The system according to claim 7, wherein after the medium carrying device has been moved to the designed position of each of the predetermined sections according to the designed arrangement, the error detector moves the medium carrying device from the designed position to the reference position in each of the predetermined sections to detect distance and direction of movement of the medium carrying device to produce the error.

10. The system according to claim 7, wherein the corrective value calculator calculates a two-dimensional distribution of error from the detected errors of the predetermined sections, and then calculates the corrective value for each of the processing sections on the base frame based on the two-dimensional distribution of error.

11. The system according to claim 10, wherein the corrective value calculator calculates a horizontal distribution of error and a vertical distribution of error from the detected errors of the predetermined sections, and then calculates the corrective value for each of the processing sections on the base frame with respect to the horizontal distribution of error and the vertical distribution of error.

12. The system according to claim 11, wherein three predetermined storage cells are selected from an M×N array of storage cells each of which is indicated by C(I,J) and is designed to store an information medium, wherein the three predetermined storage cells C(1,1), C(M,1) and C(M,N) are placed at corners of the two-dimensional array, respectively, where I, J, M, and N are an integer, $1\leq I\leq M$, and $1\leq J\leq N$;
    the error detector detects errors E(1,1), E(M,1) and E(M,N) for the three predetermined storage cells C(1,1), C(M,1) and C(M,N), respectively, and
    the corrective value calculator calculates an error E(I,1) for a storage cell C(I,1) and error E(M,J) for a storage cell C(M,J) using the following equations:

$$E(I,1)=E(1,1)+I/M\times(E(M,1)-E(1,1)) \text{ and}$$

$$E(M,J)=E(M,1)+J/N\times(E(M,N)-E(M,1));$$

and further calculates an error E(I,J) as a corrective value for a storage cell C(I,J) using the following equation:

$$E(I,J)=E(I,1)\times E(M,J)/E(M,1).$$

13. An automatic information medium carrying system for carrying an information medium from a processing section to another in a plurality of cabinets which are connected in series, each cabinet containing a pair of base frames each fixing a plurality of storage cells in a designed arrangement, each of the storage cells being designed to store an information medium, comprising:
    an error detector for detecting an error between a designed position and a reference position for each of at least three predetermined storage cells which are two-dimensionally arranged on each base frame, where the designed position is an actual position to which a medium carrying device is moved in each of the predetermined storage cells according to the designed arrangement and the reference position is a predetermined position in each of the predetermined storage cells;
    a corrective value calculator for calculating a corrective value for each of the storage cells based on detected errors of the predetermined storage cells; and
    a controller for carrying and positioning the medium carrying device at a desired storage cell using a corrective value of the desired storage cell.

14. The automatic information medium carrying system according to claim 13, wherein three predetermined storage cells are selected from an M×N array of storage cells each of which is indicated by C(I,J) and is designed to store an information medium, wherein the three predetermined storage cells C(1,1), C(M,1) and C(M,N) are placed at corners of the two-dimensional array, respectively, where I, J, M, and N are an integer, $1\leq I\leq M$, and $1\leq J\leq N$;
    the error detector detects errors E(1,1), E(M,1) and E(M,N) for the three predetermined storage cells C(1,1), C(M,1) and C(M,N), respectively, and
    the corrective value calculator calculates an error E(I,1) for a storage cell C(I,1) and error E(M,J) for a storage cell C(M,J) using the following equations:

$$E(I,1)=E(1,1)+I/M\times(E(M,1)-E(1,1)) \text{ and}$$

$$E(M,J)=E(M,1)+J/N\times(E(M,N)-E(M,1));$$

and further calculates an error E(I,J) as a corrective value for a storage cell C(I,J) using the following equation:

$$E(I,J)=E(I,1)\times E(M,J)/E(M,1).$$

* * * * *